2,962,414
HIGH STRENGTH SPECIALTY PAPERS AND PROCESSES FOR PRODUCING THE SAME

Hanns F. Arledter, Stockbridge, Mass., assignor, by mesne assignments, to Hurlbut Paper Company, a corporation of Ohio No Drawing. Filed Mar. 5, 1956, Ser. No. 569,276

10 Claims. (Cl. 162—145)

The present invention relates to new and useful improvements in the manufacture of paper, and more particularly in the manufacture of high strength specialty papers.

It is the principal object of the present invention to provide specialty papers having high strength in regard to impact, tear, tensile strength, and the like. It is a further object of the present invention to provide high strength specialty papers containing a resin powder or filler wherein the resin powder or filler is uniformly distributed throughout the paper product.

The high strength specialty papers of the invention consist of an interfelted fibrous web containing from about 30% to about 70% by weight of resin powder and from about 70% to about 30% by weight respectively of fibers of which from about 7% to about 35% by weight are synthetic fibers having a length in the range from about 6 millimeters to about 15 millimeters. The high strength specialty papers wherein the resin powder or filler is uniformly distributed throughout the paper consists of an interfelted fibrous web containing from about 30% to about 70% by weight of resin powder and from about 70% to about 30% by weight respectively of fibers of which from about 7% to about 35% by weight are synthetic fibers having a length in the range from about 6 millimeters to about 15 millimeters and from about 1% to about 20% by weight are fine siliceous fibers having a diameter less than about 2 microns. The high strength specialty paper may optionally contain an amount up to about 45% by weight of at least one filler based on the fibrous content of the paper.

The process of the present invention for preparing high strength specialty paper comprises forming an aqueous suspension containing from about 30% to about 70% by weight of resin powder and from about 70% to about 30% by weight respectively of fibers of which from about 7% to about 35% by weight are synthetic fibers having a length in the range from about 6 millimeters to about 15 millimeters, pumping the aqueous suspension to the headbox of a papermaking machine, forming a paper web, dewatering the paper web, and subsequently drying the paper web. The process of the present invention for providing high strength specialty paper containing a resin powder or filler uniformly distributed throughout the specialty paper comprises forming an aqueous suspension containing from about 30% to about 70% by weight of resin powder and from about 70% to about 30% by weight respectively of fibers of which from about 7% to about 35% by weight are synthetic fibers having a length in the range of about 6 millimeters to about 15 millimeters and from about 1% to about 20% by weight are fine siliceous fibers having a diameter less than about 2 microns, pumping the aqueous suspension to the headbox of a papermaking machine, forming a paper web, dewatering the paper web, and subsequently drying the paper web.

Any thermoplastic or thermosetting resin which can be manufactured in powder form in a particle size suitable for the process of the invention, i.e., from about 60 to about 300 mesh, and which can be processed to laminates or films under heat or pressure may be used in the high strength specialty paper. The following thermosetting resin powders are typical of those which can be employed in the specialty papers either alone or in mixtures: phenolic resins, such as phenol formaldehyde resins or phenol furfural resins; benzoguanamine formaldehyde resins; diallyl phthalate polymers; and silicone resins. Suitable thermoplastic resin powders include, for example, polyacrylic resins, such as polymethylmethacrylate; polyvinylchloride; cellulose acetate; cellulose butyrate; polyethylene; polystyrene; polyvinybutyral; polytetrafluoroethylene (Teflon); and polyvinylacetate.

The fibers which can be employed in the high strength specialty papers either alone or in admixtures include the following: so-called "papermaker fibers," such as kraft, alpha cellulose, sulfite cellulose, cotton, hemp, rag, esparto, straw, bagasse, and the like; synthetic organic fibers, such as those formed from polyamide resins made by the polymerization of a hexamethylenediamine salt of adipic acid (nylon), polytetrafluoroethylene fibers (Teflon), synthetic fibers made by the condensation of dimethylterephthalate and ethylene glycol (Dacron), synthetic fibers made from polyacrylonitrile (Orlon), synthetic fibers made by the copolymerization of 40% acrylonitrile and 60% vinylchloride (Dynel), polyvinylchloride, polyvinylidene chloride (Saran), dinitrile fibers, cellulose acetate fibers, cellulose triacetate fibers, and viscose rayon fibers; synthetic inorganic fibers, such as glass, silica, aluminum silicate, steelwool, and the like; and natural inorganic fibers, such as asbestos.

As noted above, from about 7% to about 35% by weight of the fibrous content of the specialty paper consists of the above synthetic fibers, either organic or inorganic, having a length in the range from about 6 millimeters to about 15 millimeters. It is these long synthetic fibers which impart the high strength properties to the specialty paper. The long synthetic fibers may not be cut to the desired length with a papermaker beater, since such an apparatus cuts fibers to a length in accordance with the Maxwell distribution curve, e.g., for every fiber of 6 millimeter length there would be 25 fibers or more below 6 millimeters in length and ranging from 1 to 5 millimeters. The long synthetic fibers having a length from 6 millimeters to 15 millimeters are pre-cut with a fiber cutter to the desired length.

In the high strength specialty paper having resin powder uniformly distributed throughout there is also present fine siliceous fibers having a diameter less than about 2 microns. The fine siliceous fibers may be glass fibers having a diameter from 0.1 to 2.0 microns, or asbestos fibers having a diameter from 0.02 to 0.05 micron. The fine siliceous fibers act as a resin and filler dispersion and retention aid as noted below.

When an aqueous suspension of fibers without the presence of fine siliceous fibers is fed upon the wire of a papermaking machine to form a wet interfelted web, the pores of the paper web as well as the interstices of the wire of the papermaking machine are larger than the particle size of resin powder or filler. When suction is applied to the wet paper web, the resin powder or filler is partially removed from the wet paper web resulting in a decrease in concentration of the resin powder or filler in passing from the felt side of the paper web to the wire side thereof. This is particularly noticeable when dark resin powder is used in making a paper. In such an instance, the felt side of the wet paper web has a dark color, while the wire side thereof has a very light color, thereby indicating a decrease in concentration of resin powder in passing from the felt side of the paper to the wire side thereof. However, when fine siliceous fibers are present in the aqueous slurry, the vast number of fine siliceous fibers overlap the pores of the paper web and thereby materially reduce the pore size thereof. By so reducing the pore size of the wet paper web the fine siliceous fibers entrap the small resin particles or filler particles uniformly within the wet paper web and prevent their removal therefrom by suction during dewatering of the wet paper web. Although the fine siliceous fibers reduce the pore size of the wet paper web and make the paper denser, the stock is still free and dewatering by removal of white water is quite fast on the wire of a paper machine. The fine siliceous fibers also aid in dispersing the resin powder and filler as well as the long fibers within the aqueous suspension prior to formation of the paper web.

The use of well fibrillated cellulose also yields fine, but very short, fibrils. Their use improves resin retention somewhat, but it was found that the dewatering of the slimy, slow stock on the paper machine becomes very difficult and makes the production of paper slow and uneconomical, and even impossible. Accordingly, well fibrillated cellulose fibers may not be used as the resin dispersion and retention aid.

It is preferred to incorporate the fine siliceous fibers into the aqueous slurry of fibers and resin powder and filler in the form of a dispersion in which the fine fibers are individualized. Fine fibers tend to agglomerate and form fiber bundles. Any fiber bundle may act only as one fiber and many more fine fibers are necessary, in such a case, to obtain the same results.

Fine glass fibers, for example, disperse more readily if the fiber slurry is processed at a pH of 2.8–3.4. A 0.75 micron glass fiber slurry yields the following results:

| Medium | pH | Fiber Dispersion | Freeness SR (2 g. in 1,000 cc.) | Drainage Time (Seconds) |
| --- | --- | --- | --- | --- |
| Water | 6.3 | Fair | Approx. 54 | 73 |
| Water+Alum | 4.3 | Fair | Approx. 54 | 73 |
| Water+Sulfuric Acid | 3.3 | Very Good | 64 | 75 |

The gelatinous fiber individualization in this manner becomes quite obvious as seen from this freeness test. Such a fiber slurry also shows a higher viscosity and keeps the filler and resin particles in better suspension. It will be appreciated, however, that there are also other methods to individualize glass fibers with dispersing agents, fatty acids, carboxymethylcellulose, etc.

Colloidized asbestos fibers are preferably employed as the fine asbestos fibers. A method of obtaining asbestos dispersions is described in U.S. Patent No. 2,626,213 to I. J. Novak. Straight XX asbestos papermaking fibers possess a Williams freeness (3 g. in 100 cc.) of 260–420 seconds. The same fibers, properly dispersed with an organic crysotile asbestos colloidizing agent of the nature of a sulfonated ester, increase the freeness of the fiber dispersion to 10,000–50,000 seconds.

The high strength specialty paper either with or without the fine siliceous fibers may contain as an optional component an amount, e.g., 0.5%, up to about 45% by weight of filler based on the fiber content of the paper. The term "filler" as used herein includes such fillers as are conventionally employed in papermaking as well as pigments. Typical examples of fillers which may be incorporated in the high strength specialty paper either alone or in mixtures include titanium dioxide, zinc sulfide, kaolin, diatomaceous earth, barium sulfate, and organic and inorganic pigments. It is possible to incorporate fluorescent or luminescent materials in powder form into the paper and laminates or films formed therefrom with high light emission properties especially if the specialty papers are in transparent form.

The specialty papers of the invention may be used to form high strength films as well as laminates. The specialty paper containing resin powder and long synthetic fibers is heat calendered with a heat and pressure calender, or in presses, with a temperature according to the melting or softening point of the resin to form films or laminates having good properties. Films made from the specialty paper containing long synthetic fibers show improved edge tear (3–5 times) fold (3–20 times), and moldability as compared with resin powder filled paper made entirely of short fibers of about 2–4 millimeters in length.

Laminates made from the specialty papers of the invention show improved tensile strength, impact strength, and punchability. The impact strength of laminates made entirely from short fiber paper (2–4 millimeters in length) may be 0.4–0.9 foot pound per inch of laminate, while the high strength specialty papers of the invention permit the formation of laminates having an impact strength of, for example, 1.5–2.0 foot pounds per inch of laminates or higher.

The high strength specialty papers of the invention permit the formation of curved laminates and articles having increased moldability. The long synthetic fibers having a length in the range from about 6 millimeters to about 15 millimeters impart to the specialty paper higher stretch and less tear. The paper is, therefore, less apt to break or tear at points of stress in the molding press during the lamination procedure. Thus, more complicated molded structures with sharper curves become feasible when the specialty papers of the invention are employed.

The products and process of the invention will be further illustrated in connection with the following examples.

EXAMPLE 1

500 parts of kraft pulp was beaten in a conventional papermaker beater to a beating degree of 18° S.R. at a stock consistency of 6%. 600 parts of phenol formaldehyde resin powder with a mesh size of 100–200 was dispersed in 5000 parts of water containing 1 part of high viscosity guar gum and this slurry was added to the beaten kraft pulp. The stock was then diluted with water to a stock consistency of 25 grams per liter. 100 parts of high strength nylon fibers were cut to uniform length of 15 millimeter with a fiber cutter, soaked and dispersed with the help of 5 millliters of Aerosol OT wetting agent (dioctyl ester of sodium sulfosuccinate) and high viscosity guar gum in 500 parts of water. The long well dispersed synthetic nylon fibers were then added to the diluted kraft pulp and resin powder slurry, and mixed. The aqueous suspension was pumped to the headbox of a pilot Fourdrinier papermaking machine. A paper web was formed thereon and dewatered and then subsequently dried. The paper weighed 200–220 pounds (24 inches by 36 inches—500 sheets). This paper had the following physical properties: tensile strength, 22,000 grams per inch; Mullen number, 55; tear, 590/1000 grams; stretch, very good; and moldability, very good. A laminate prepared therefrom showed improved strength properties and punchability. The high strength specialty paper contained 42% by weight of kraft fibers, 8% by weight of long synthetic nylon fibers having a length of 15 millimeters, and 50% by weight phenol formaldehyde resin powder.

EXAMPLE 2

50 parts of coarse glass fibers having a diameter of 3 microns and 50 parts of fine glass fibers having a diameter of 1 micron were mixed in 10,000 parts of water with 50 parts of coarse 3 denier Dynel fibers having a length of 3–5 millimeters and were then well dispersed. 300 parts of powdered diallylphthalate polymer were then added. This stock was diluted to a fiber slurry of 5 grams per liter. 50 parts of Dynel fibers cut to a length of 12.5 millimeters and 15.6 millimeters were dispersed in 1000 parts of water. Both fiber slurries were then mixed together and pumped to the headbox of a pilot plant Fourdrinier machine. A paper web was formed on the wire thereof, dewatered, and subsequently dried. The resin retention was 91%. The high strength specialty paper had a uniform resin powder distribution and contained 60% by weight powdered diallylphthalate polymer, 10% by weight coarse glass fibers, 10% by weight coarse Dynel fibers, 10% by weight long synthetic Dynel fibers having a length of 12.5 millimeters and 15.6 millimeters, and 10% by weight of fine glass fibers having a diameter of 1 micron. Ten layers of this paper was laminated at 300° F. for ten minutes at 1000 p.s.i. Laminates with very low moisture absorbency (0.4%), excellent electrical properties, and good strength were obtained.

EXAMPLE 3

200 parts of sulfite cellulose fibers of a beating degree of 18° S.R., 40 parts of titanium dioxide filler and pigment colors, 300 parts of benzoguanamine formaldehyde resin, and 20 parts of fine individualized glass fibers having a diameter of 0.75–1 micron were mixed together at a stock consistency of 1%. 40 parts of long high strength cellulose acetate fibers, especially stretched and saponified and cut to a length of 9.3 millimeters, were dispersed in a fiber slurry and the two slurries mixed together. The composite aqueous suspension was pumped to the headbox of a papermaking machine, formed into a paper web thereon, dewatered, and subsequently dried. A paper of 156 pounds (24 inches by 36 inches—500 sheets) was manufactured thereby. The high strength specialty paper had a uniform resin powder distribution and contained 54% by weight benzoguanamine formaldehyde resin powder, 36% by weight sulfite cellulose fibers, 7% by weight long synthetic cellulose acetate fibers having a length of 9.3 millimeters, 3% by weight of fine glass fibers having a diameter of 0.75–1 micron, and 15% by weight of titanium dioxide filler and pigment colors based on the fibrous content of the paper. This paper was pressed at 500 p.s.i. and 300° F. for ten minutes over plywood. A smooth, opaque, decorative surface with good bending properties was obtained thereby. The same high strength specialty paper was pressed over a curved wooden surface and a smooth decorative surface without visible cracks on the bent edges was obtained.

In Table I below there is presented data comparing the strength properties of a specialty paper produced in accordance with the process of the invention containing long synthetic fibers having a length in a range from about 6 millimeters to about 15 millimeters with the strength properties of specialty papers which do not contain such long synthetic fibers.

Paper A contained 50% by weight short sulfite cellulose fibers having a length of 2–4 millimeters and 50% by weight phenol formaldehyde resin powder. Paper B contained 50% by weight phenol formaldehyde resin powder, 34% by weight sulfite cellulose fibers having a length of 2–4 millimeters, and 16% by weight of long synthetic Dynel fibers having a length of 9–12 millimeters. Paper C contained 50% by weight short glass fibers having a length of 3–6 millimeters and 50% by weight of phenol formaldehyde resin powder. Paper D contained 45% by weight phenol formaldehyde resin powder, 25% by weight short glass fibers having a length of 3–6 millimeters, 15% by weight of short Orlon fibers having a length of 4–6 millimeters, and 15% by weight of long Dynel fibers having a length of 9–12 millimeters. These four papers were prepared in accordance with the process of the invention with the exception that Papers A and C did not contain long synthetic fibers.

*Table I*

| Strength Properties | Paper A | Paper B | Paper C | Paper D |
|---|---|---|---|---|
| Moldability of Paper | Fair | Very Good | Fair-poor | Very good. |
| Impact Strength of Laminate (ft.-lb./in.) | 0.4–0.9 | 1–1.3 | 0.8 | 1.5. |
| Punchability of Laminate | Fair | Good | Poor | Good. |
| Electrical Properties of Laminate | do | Good | Fair | Good | Do. |
| Tear Strength of Paper, 200 lb. weight Basis (g.) | 235–300 | 780–1,200 | 211–220 | 480–1,000. |

From the data presented in Table I above it may be readily seen that Papers B and D containing long synthetic fibers had far superior strength properties compared to Papers A and C which did not contain long synthetic fibers.

In Table II below there is presented data further comparing properties of specialty papers produced in accordance with the process of the invention which contain long synthetic fibers or long synthetic fibers and fine siliceous fibers compared with the properties of specialty papers which do not contain such fibers. In Table II Paper E contained 50% by weight short coarse glass fibers having a diameter of 5.5 microns and a length of 1–5 millimeters, and 50% by weight of polystyrene resin powder. Paper F contained 40% by weight kraft cellulose fibers, 10% by weight long dinitrile fibers having a length of 10 millimeters, and 50% by weight polystyrene resin powder. Paper G contained 45% by weight short coarse glass fibers having a diameter of 5.5 microns and a length of 3–6 millimeters, 5% by weight of fine glass fibers having a diameter of 0.5 micron, and 50% by weight of polystyrene resin powder. Paper H contained 30% by weight short coarse glass fibers having a diameter of 5.5 microns and a length of 3–6 millimeters, 15% by weight long coarse glass fibers having a diameter of 5–5 microns and a length of 10 millimeters, 5% by weight of fine glass fibers having a diameter of 0.5 micron, and 50% by weight of polystyrene resin powder. Paper I contained 20% by weight long Dynel fibers having a length of 14 millimeters, 20% by weight of coarse glass fibers having a diameter of 3 microns, 10% by weight of fine glass fibers having a diameter of 1 micron, and 50% by weight of polystyrene resin powder.

*Table II*

| | Paper E | Paper F | Paper G | Paper H | Paper I |
|---|---|---|---|---|---|
| Percent Resin Retention | 70 | 78 | 96 | 94.5 | 97. |
| Dispersibility of Solids in Aqueous Suspension. | Very poor | Good | Good | Good | Good. |
| Uniformity of Resin Distribution in Paper | do | Fair | do | do | Do. |
| Sheet Forming Properties on Pilot Paper Machine. | Poor | Good | Very good | do | Do. |

From a study of the above data it can be readily seen that the high strength specialty papers containing long synthetic fibers, especially those which also contained fine siliceous fibers, had superior properties compared to a paper without the long synthetic fibers.

It will be appreciated that various modifications and changes may be made in the product and process of the invention by those skilled in the art and accordingly the invention is to be limited only within the scope of the appended claims.

I claim:

1. A high strength specialty paper consisting of an interfelted fibrous web containing from about 30% to about 70% by weight of resin powder and from about 70% to about 30% by weight respectively of fibers of which from about 7% to about 35% by weight are synthetic fibers having a length in the range from about 6 millimeters to about 15 millimeters; said resin powder being freely distributed in the interstices of the paper.

2. A high strength specialty paper as set forth in claim 1 containing an amount up to about 45% by weight of at least one filler based on the fibrous content of the paper.

3. A high strength specialty paper consisting of an interfelted fibrous web containing from about 30% to about 70% by weight of resin powder and from about 70% to about 30% by weight respectively of fibers of which from about 7% to about 35% by weight are synthetic fibers having a length in the range from about 6 millimeters to about 15 millimeters and from about 1% to about 20% by weight are fine siliceous fibers having a diameter less than about 2 microns; said resin powder being freely and uniformly distributed in the interstices of the paper.

4. A high strength specialty paper as set forth in claim 3 wherein the fine siliceous fibers are glass fibers having a diameter from 0.1 to 2.0 microns.

5. A high strength specialty paper as set forth in claim 3 wherein the fine siliceous fibers are asbestos fibers having a diameter from 0.02 to 0.05 micron.

6. The process of preparing a high strength specialty paper having resin powder freely distributed in the interstices of the paper comprising forming an aqueous suspension containing from about 30% to about 70% by weight of resin powder and from about 70% to about 30% by weight respectively of fibers of which from about 7% to about 35% by weight are synthetic fibers having a length in the range from about 6 millimeters to about 15 millimeters, pumping the aqueous suspension to the headbox of a papermaking machine, forming a paper web-dewatering the web, and subsequently drying the paper web.

7. The process of preparing a high strength specialty paper having resin powder freely and uniformly distributed in the interstices of the paper comprising forming an aqueous suspension containing from about 30% to about 70% by weight of resin powder and from about 70% to about 30% by weight respectively of fibers of which from about 7% to about 35% by weight are synthetic fibers having a length in the range from about 6 millimeters to about 15 millimeters and from about 1% to about 20% by weight are fine siliceous fibers having a diameter less than about 2 microns, pumping the aqueous suspension to the headbox of a papermaking machine, forming a paper web, dewatering the web, and subsequently drying the paper web.

8. The process as set forth in claim 7 wherein the fine siliceous fibers are asbestos fibers having a diameter from 0.02 to 0.05 micron.

9. A process as set forth in claim 7 wherein the fine siliceous fibers are glass fibers having a diameter from 0.1 to 2.0 microns.

10. The process as set forth in claim 7 wherein the aqueous suspension contains an amount up to about 45% by weight of filler based on the fiber content of the paper.

References Cited in the file of this patent

UNITED STATES PATENTS

| | | |
|---|---|---|
| 1,684,755 | Clapp | Sept. 18, 1928 |
| 2,221,945 | Hanson | Nov. 19, 1940 |
| 2,477,000 | Osborne | July 26, 1949 |
| 2,496,655 | Hermanson | Feb. 7, 1950 |
| 2,581,069 | Bertolet | Jan. 1, 1952 |
| 2,706,156 | Arledter | Apr. 12, 1955 |
| 2,708,982 | McGuff | May 24, 1955 |
| 2,721,139 | Arledter | Oct. 18, 1955 |

FOREIGN PATENTS

| | | |
|---|---|---|
| 508,539 | Canada | Dec. 26, 1954 |
| 593,625 | Great Britain | Oct. 22, 1947 |

UNITED STATES PATENT OFFICE
CERTIFICATION OF CORRECTION

Patent No. 2,962,414                          November 29, 1960

Hanns F. Arledter

It is hereby certified that error appears in the above numbered patent requiring correction and that the said Letters Patent should read as corrected below.

Column 3, line 52, for "100" read -- 1000 --; column 4, line 44, for "500" read -- 5000 --; column 6, line 56, for "5-5" read -- 5.5 --.

Signed and sealed this 30th day of May 1961.

(SEAL)
Attest:

ERNEST W. SWIDER
Attesting Officer

DAVID L. LADD
Commissioner of Patents